(No Model.)
L. C. LOWDEN.
WIRE FENCE MACHINE.
No. 466,499.  Patented Jan. 5, 1892.
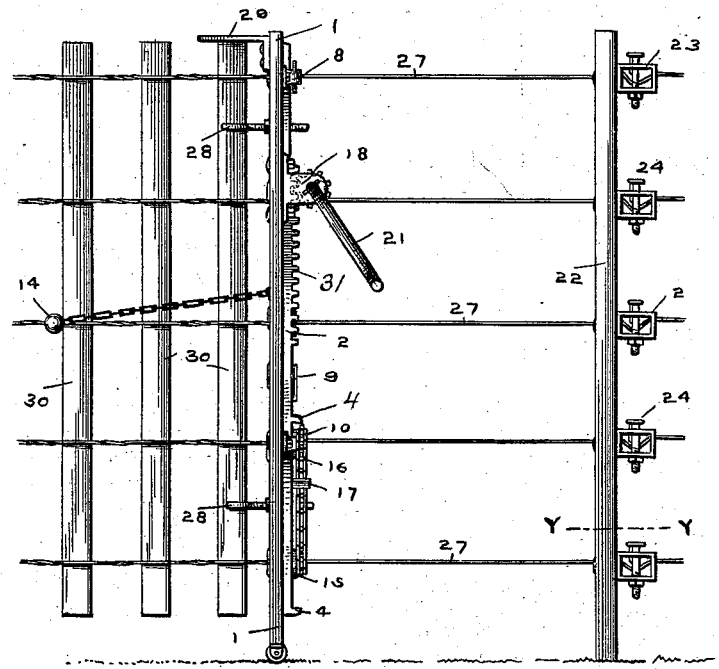
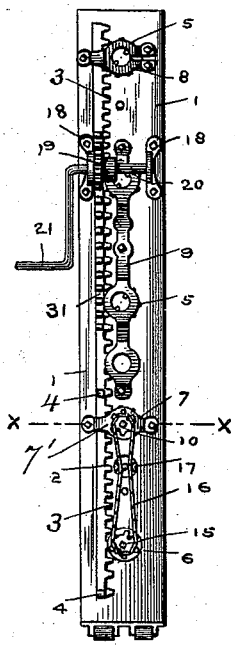
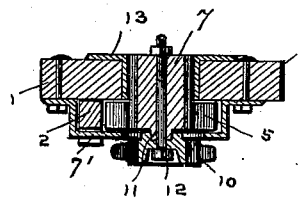
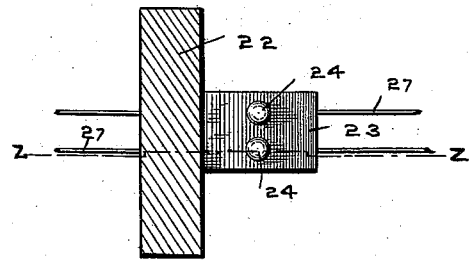
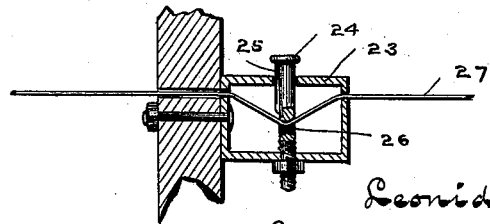
Witnesses
H. D. Nealy
E. B. Griffith
Inventor
Leonidas C. Lowden
By his Attorney
C. P. Jacobs.

UNITED STATES PATENT OFFICE.

LEONIDAS C. LOWDEN, OF INDIANAPOLIS, INDIANA.

WIRE-FENCE MACHINE.

SPECIFICATION forming part of Letters Patent No. 466,499, dated January 5, 1892.

Application filed June 15, 1891. Serial No. 396,393. (No model.)

*To all whom it may concern:*

Be it known that I, LEONIDAS C. LOWDEN, of Indianapolis, county of Marion, and State of Indiana, have invented certain new and useful Improvements in Wire-Fence Machines; and I do hereby declare that the following is a full, clear, and exact description thereof, reference being had to the accompanying drawings, in which like figures refer to like parts.

My invention relates to the construction of machines for weaving wires about pickets in making fences, and is an improvement upon the device shown in Letters Patent No. 409,477, issued to me August 20, 1889, and will be understood from the following description.

In the drawings, Figure 1 is a side view of the machine set up in the field for operation, with several pickets inclosed between the twisted wires. Fig. 2 is a front view of the machine itself. Fig. 3 is a cross-section on the line X X, Fig. 2. Fig. 4 is a cross-section on the line Y Y, Fig. 1. Fig. 5 is a sectional view on the line Z Z, Fig. 4.

In detail, 1 is the frame, and 2 is a rack-bar having teeth 3 one side its entire length, these teeth engaging with pinions 5 of the twisters, which have openings on each side through them to admit the passage of the fence-wires. 6 and 7 are also twisters, the lower one of these not provided with a pinion, but having a sprocket-wheel 15 driven directly by a chain 16, engaging with the teeth of the sprocket-wheel 10, mounted upon a projection 11 of the twister inclosed beneath the clamp-socket 7', the sprocket-wheel and twister being united by a bolt 12, as shown in Fig. 3. This twister 7 is driven by the rack-bar 2. The object of driving the lower twister 6 by means of the chain 16 is twofold: First, it enables me to locate this twister nearer the surface of the ground than is possible where all the twisters are driven directly by the rack-bar, because if it were driven by the rack-bar the latter would not have vertical movement enough to give the twister more than one-half or a complete twist, whereas two or three are necessary; second, the weight of the fence is carried largely by the twisters, and if a twister be not provided near the ground the weight of the fence, if carried by the machine, makes it difficult to move the latter along the line of the fence, while by placing the twister near the ground the fence at a short distance away will rest upon the ground itself, and therefore ease the load of the machine and enable the latter to be moved along easily while at work. I therefore provide that the lower twister 6 shall be driven through the medium of the chain 16, which is revolved by the engagement of the teeth of the rack-bar with those of the twister 7, to which the sprocket-wheel 10 is connected in the manner described.

13 are collars in which the back end of the twisters set, forming a lining and preventing any wear upon the wood.

9 is a clamp-socket bar, which has openings at suitable distances and is intended to allow the adjustment of the central spool so as to regulate the space between the wires, and is for a similar purpose and of a similar construction to the clamp-socket bar shown in my Letters Patent No. 409,477, and is no part of the present invention, reference being made to said Letters Patent for the further description thereof.

The rack-bar 2 has a central series of teeth 31 on the front side at right angles to the line of the main teeth 3, and the teeth of the pinion 19, which is mounted on the crank-shaft 20, have bearings in ears or brackets 18, connected to the frame, and, terminating in the crank 21, engage with the teeth 31 and reciprocate the rack-bar, at the same time revolving the twisters.

4 are stops connected to the rack-bar, which strike, respectively, on opposite sides of the clamp-socket 7' as the bar is drawn upward and downward by means of the crank-pinion.

17 is a tightener for taking up the slack of the sprocket-chain 16.

23 are frame-works secured by bolts to one side of the tension-post 22, as best shown in Fig. 5, such tension-post being set up at a convenient distance on one side of the main frame 1.

28 are spacers for regulating the distance between the pickets, their inner ends being forked and their opposite ends passing through openings in the frame and secured by a nut, and may be adjusted thereby.

14 is a lever having a chain attached for forcing the picket 30 up into the bight of the wires, and is a similar device to that shown in my Letters Patent No. 409,477.

29 is a stop at the top of the frame for adjusting the height of the picket.

8 is a clamp-socket for holding the upper twister in place, and is provided with a raised part in line with the rack-bar for the passage of the same.

24 is a pin passing through an opening in the frame-work 23 and secured below by a nut. This pin is provided with a rib 25, entering a notch in the frame-work and preventing the pin from turning. The fence-wire 27 passes through an opening in the post and also through a slot in the pin and through an opening in the frame-work beyond, and by turning down the nut upon this pin it is obvious that pressure is brought to bear upon the wire, increasing its tension, as shown in Fig. 5.

What I claim as my invention, and desire to secure by Letters Patent, is the following:

In a wire-fence machine, a frame-work, a series of twisting-spools revolving therein provided with teeth on their peripheries, a rack-bar moving vertically in the frame-work and having teeth on one edge and centrally upon the side, a crank-shaft journaled in bearings on the frame-work, a pinion mounted on such shaft engaging with the central teeth on the side of the rack-bar for reciprocating the same, the teeth on the edge of the bar engaging with those of the twisting-spools, whereby they are revolved, the upper twister held in place by a clamp-socket raised upon one side for allowing the passage of the rack-bar, the central twisting-spools fitting in openings in a central-socket clamp-bar, allowing their adjustment as to space, the lower spool carrying a sprocket-wheel upon its outer face and driven by a chain from a sprocket connected to the spool above, a tightening device for taking up the slack of the chain, and a crank for operating the mechanism, all combined substantially as shown and described.

In witness whereof I have hereunto set my hand this 9th day of June, 1891.

LEONIDAS C. LOWDEN.

Witnesses:
E. B. GRIFFITH,
C. P. JACOBS.